(12) United States Patent
Wang et al.

(10) Patent No.: US 11,400,451 B2
(45) Date of Patent: Aug. 2, 2022

(54) MICROFLUIDIC DETECTION CIRCUIT AND DRIVING METHOD THEREOF, AND MICROFLUIDIC APPARATUS

(71) Applicant: BOE TECHNOLOGY GROUP CO., LTD., Beijing (CN)

(72) Inventors: Pengpeng Wang, Beijing (CN); Haisheng Wang, Beijing (CN); Xiaoliang Ding, Beijing (CN); Yanling Han, Beijing (CN); Ping Zhang, Beijing (CN); Xueyou Cao, Beijing (CN); Chihjen Cheng, Beijing (CN); Jiabin Wang, Beijing (CN); Yangbing Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 404 days.

(21) Appl. No.: 16/475,093

(22) PCT Filed: Dec. 26, 2018

(86) PCT No.: PCT/CN2018/123824
§ 371 (c)(1),
(2) Date: Jun. 29, 2019

(87) PCT Pub. No.: WO2019/205696
PCT Pub. Date: Oct. 31, 2019

(65) Prior Publication Data
US 2021/0339254 A1 Nov. 4, 2021

(30) Foreign Application Priority Data

Apr. 23, 2018 (CN) .......................... 201810366918.6

(51) Int. Cl.
*B01L 3/00* (2006.01)
*G01N 27/22* (2006.01)

(52) U.S. Cl.
CPC ... *B01L 3/502792* (2013.01); *B01L 3/502715* (2013.01); *G01N 27/221* (2013.01);
(Continued)

(58) Field of Classification Search
CPC .. B01L 3/502792; B01L 3/5027; B01L 3/502; B01L 3/50; B01L 3/502715;
(Continued)

(56) References Cited

U.S. PATENT DOCUMENTS

2005/0092606 A1 5/2005 Reich et al.

FOREIGN PATENT DOCUMENTS

CN 107583694 A 1/2018

OTHER PUBLICATIONS

English Machine Translation of CN 108593724A Description, obtained from https://worldwide.espacenet.com on Nov. 16, 2021, pp. 1-50. (Year: 2021).*

(Continued)

*Primary Examiner* — Christine T Mui
(74) *Attorney, Agent, or Firm* — Syncoda LLC; Feng Ma (57) ABSTRACT

A microfluidic circuit includes a detection capacitor, having a first terminal and a second terminal that are spaced apart from one another to thereby form a space therebetween. The circuit is configured to detect a droplet present in the space by detecting a change of a capacitance value of the detection capacitor caused by a change of a dielectric constant between the first terminal and the second terminal, and to drive a formation of an electrical field formed using at least one of the first terminal and the second terminal of the detection capacitor to thereby drive the droplet to move in the electrical field.

19 Claims, 7 Drawing Sheets

(52) U.S. Cl.
CPC . *B01L 2300/0645* (2013.01); *B01L 2300/161* (2013.01); *B01L 2400/0415* (2013.01)

(58) Field of Classification Search
CPC ....... B01L 2300/0645; B01L 2300/161; B01L 2400/0415; G01N 27/221; G01N 27/22; G01N 27/02
USPC ................................ 422/502, 500; 436/149
See application file for complete search history.

(56) References Cited

OTHER PUBLICATIONS

CN First Office Action in Application No. 201810366918.6, dated Dec. 4, 2019.
Power detection and fault diagnosis technology book. Transformer, reactor, transformer volume (vol. 1), Sep. 30, 2005, State Grid Corporation of China, Wuhan High Voltage Research Institute; pp. 156-161.
International Search Report in Application No. PCT/CN2018/123824, dated Mar. 27, 2019.

\* cited by examiner

MICROFLUIDIC DETECTION CIRCUIT AND DRIVING METHOD THEREOF, AND MICROFLUIDIC APPARATUS

CROSS-REFERENCE TO RELATED APPLICATION

The present application claims priority to Chinese Patent Application No. 201810366918.6 filed on Apr. 23, 2018, the disclosure of which is hereby incorporated by reference in its entirety.

TECHNICAL FIELD

The present disclosure relates generally to the field of microfluidic technologies, and more specifically to a microfluidic detection circuit, its driving method, and a microfluidic apparatus containing the microfluidic detection circuit.

BACKGROUND

Microfluidic technology is a technology to control microfluidic droplets, and is utilized widely in fields such as chemistry and medical sciences. For example, microfluidic technology may be configured to control two droplets to move along a preset or pre-specified track so that they may meet at a preset location and react with each other.

In order to ensure that a droplet can move along a preset track, the locations of the droplet at each different moments need to be detected first. In existing microfluidic detection technologies, however, the signal-to-noise ratio is relatively low, and the detection accuracy is relatively poor.

SUMMARY

In a first aspect, the present disclosure provides a circuit, which is utilized for the detection of microfluidic droplets.

The circuit includes a detection capacitor, which comprises a first terminal and a second terminal, spaced apart from one another to thereby form a space therebetween. The circuit is configured to detect a droplet present in the space by detecting a change of a capacitance value of the detection capacitor caused by a change of a dielectric constant between the first terminal and the second terminal, and to drive a formation of an electrical field formed using at least one of the first terminal and the second terminal of the detection capacitor to thereby drive the droplet to move in the electrical field.

The circuit can further include a writing sub-circuit, a voltage dividing sub-circuit, and a reading sub-circuit. The first terminal of the detection capacitor is electrically connected to a first voltage terminal. The writing sub-circuit is electrically connected to a second voltage terminal and to the second terminal of the detection capacitor respectively, and is configured to write a first signal from the second voltage terminal into the second terminal of the detection capacitor. The voltage dividing sub-circuit is electrically connected to the second terminal of the detection capacitor, and is configured to divide a voltage at the second terminal of the detection capacitor. The reading sub-circuit is electrically connected to the voltage dividing sub-circuit, and is configured to read an electric signal at the second terminal of the detection capacitor after the voltage thereat is divided by the voltage dividing sub-circuit, wherein the electric signal reflects the capacitance value of the detection capacitor.

According to some embodiments of the circuit, the voltage dividing sub-circuit comprises a first transistor and a voltage dividing capacitor.

A gate electrode of the first transistor is electrically connected to a first control terminal; a first electrode of the first transistor is electrically connected to the second terminal of the detection capacitor; and a second electrode of the first transistor is electrically connected to the reading sub-circuit.

A first terminal of the voltage dividing capacitor is electrically connected to a third voltage terminal; and a second terminal of the voltage dividing capacitor is electrically connected to the reading sub-circuit and the second electrode of the first transistor.

According to some embodiments of the circuit, the reading sub-circuit comprises a second transistor. A gate electrode of the second transistor is electrically connected to a second control terminal; a first electrode of the second transistor is electrically coupled to the voltage dividing sub-circuit; and a second electrode of the second transistor is electrically connected to a reading terminal.

According to some embodiments of the circuit, the reading sub-circuit further comprises a third transistor. A gate electrode of the third transistor is electrically connected to the voltage dividing sub-circuit; a first electrode of the third transistor is electrically connected to a fourth voltage terminal; and a second electrode of the third transistor is electrically connected to the first electrode of the second transistor. The second electrode of the second transistor is further electrically connected to a constant current source terminal.

According to some embodiments of the circuit, the writing sub-circuit comprises a fourth transistor. A gate electrode of the fourth transistor is electrically connected to a third control terminal; a first electrode of the fourth transistor is electrically connected to the second voltage terminal; and a second electrode of the fourth transistor is electrically connected to the second terminal of the detection capacitor.

In any one embodiment of the circuit described above, the circuit can further include a processor, which is electrically coupled to the reading terminal and is configured to obtain a voltage outputted from the reading terminal to thereby calculate the electric signal at the second terminal of the detection capacitor.

According to some embodiments, the processor is further configured to control the circuit to drive the droplet to move in the electrical field.

Optionally, the processor is configured to control the circuit to drive the droplet to move in the electrical field in a time-sharing manner, or alternatively in a simultaneous manner, with controlling the circuit to detect the droplet.

According to some embodiments, the circuit further includes a driving electrode, which is arranged over one of the first terminal and the second terminal of the detection capacitor. The driving electrode is electrically coupled to the processor and is configured, under control of the processor, to form the electric field between the driving electrode and the one of the first terminal and the second terminal of the detection capacitor to thereby drive the droplet to move in the electric field.

Herein, the circuit can optionally include a fifth transistor. A first electrode of the fifth transistor is electrically connected to the driving electrode; a gate electrode of the fifth transistor is electrically connected to a fourth control terminal; and a second electrode of the fifth transistor is electrically connected to a fifth voltage terminal. The processor is electrically coupled with the fourth control terminal and is configured to control whether to turn on the fifth transistor to allow a signal from the fifth voltage terminal to load to the driving electrode to thereby form the electric field between the driving electrode and the one of the first terminal and the second terminal of the detection capacitor.

According to some other embodiments of the circuit, the detection capacitor is electrically coupled to the processor, and is configured, under control of the processor, to form the electrical field between the first terminal and the second terminal thereof to thereby drive the droplet to move in the electrical field.

Herein, optionally, the circuit can further include a sixth transistor. A gate electrode of the sixth transistor is electrically connected to, and configured to receive a control signal from, a sixth control terminal; a first electrode of the sixth transistor is electrically connected to, and configured to receive a driving voltage from, a seventh voltage terminal; and a second electrode of the sixth transistor is electrically connected to the second terminal of the detection capacitor; and the is electrically connected to the processor. The processor is electrically coupled with the sixth control terminal and is configured to control whether to turn on the sixth transistor to allow a signal from the seventh voltage terminal to load to the second terminal of the detection capacitor to thereby form the electric field between the first terminal and the second terminal of the detection capacitor.

According to some embodiments, the sixth transistor is also included in the writing sub-circuit, and the seventh voltage terminal is the second voltage terminal electrically connected with the writing sub-circuit.

In a second aspect, the present disclosure further provides a microfluidic apparatus.

The microfluidic apparatus includes at least one circuit, and each of the at least one circuit is based on any one embodiment of the circuit as described above.

The microfluidic apparatus further includes a first substrate and a second substrate, opposing to each other. The each of the at least one circuit is between the first substrate and the second substrate. The first terminal of the detection capacitor is a common electrode, arranged over a side of the first substrate proximal to the second substrate; the second terminal of the detection capacitor is a detection electrode, arranged over a side of the second substrate proximal to the first substrate; and the common electrode and the detection electrode are opposing to each other to thereby form the space accommodating the droplet.

According to some embodiments, the microfluidic apparatus further includes a driving electrode, opposing to the common electrode. The driving electrode is configured to form the electric field with the common electrode to thereby drive the droplet to move therein.

According to some other embodiments of the microfluidic apparatus, the detection electrode is further configured as a driving electrode for driving the droplet to move in a time sharing manner with serving as the detection electrode for detecting the droplet in the space.

In any one of the embodiments of the microfluidic apparatus, a number of the at least one circuit is more than one, and as such, a common electrode in each of the at least one circuit is arranged at a substantially same layer; and common electrodes in at least two circuits are integrated with one another.

In a third aspect, the present disclosure further provides a method for driving a circuit. The circuit can be based on any one of the embodiments of the circuit described above.

The method can comprise a detecting phase, which comprises the following steps:

writing a signal to the second terminal of the detection capacitor;

dividing a voltage at the second terminal of the detection capacitor;

reading an electric signal corresponding to the second terminal of the detection capacitor after voltage division; and detecting a droplet according to the electric signal.

The method can also comprise a driving phase, which comprises a step of:

providing a driving signal to the at least one of the first terminal and the second terminal of the detection capacitor to thereby drive the droplet to move in the electrical field.

According to some embodiments, the circuit further comprises a driving electrode, configured to be able to form the electrical field with one of the first terminal and the second terminal of the detection capacitor. As such, between the detecting phase and the driving phase, the method further comprises a step of:

determining whether to perform the driving phase based on a result of detection of the droplet.

According to some other embodiments, in the circuit, the first terminal and the second terminal of the detection capacitor are further configured to be able to form the electrical field, and as such in the method, the detection phase and the driving phase are in a time-sharing manner.

Throughout the disclosure, the phrase "at a substantially same layer" is referred to as a situation where two components or two structures are formed by a substantially same material layer, and as such, they are located in the same layer in terms of layer arrangement. It is noted, however, that it does not necessarily mean that the respective distance between each of the two components or the two structures to a same plane is equal, and furthermore, it does not mean that their structures are the same as the structures of other layers.

Other embodiments may become apparent in view of the following descriptions and the attached drawings.

BRIEF DESCRIPTION OF THE DRAWINGS

To more clearly illustrate some of the embodiments, the following is a brief description of the drawings. The drawings in the following descriptions are only illustrative of some embodiments. For those of ordinary skill in the art, other drawings of other embodiments can become apparent based on these drawings.

DETAILED DESCRIPTION

In the following, with reference to the drawings of various embodiments disclosed herein, the technical solutions of the embodiments of the disclosure will be described in a clear and fully understandable way. It is obvious that the described embodiments are merely a sub-circuit but not all of the embodiments of the disclosure. Based on the described embodiments of the disclosure, those ordinarily skilled in the art can obtain other embodiment(s), which come(s) within the scope sought for protection by the disclosure.

In a first aspect, the present disclosure provides a microfluidic detection circuit.

Figure 1:
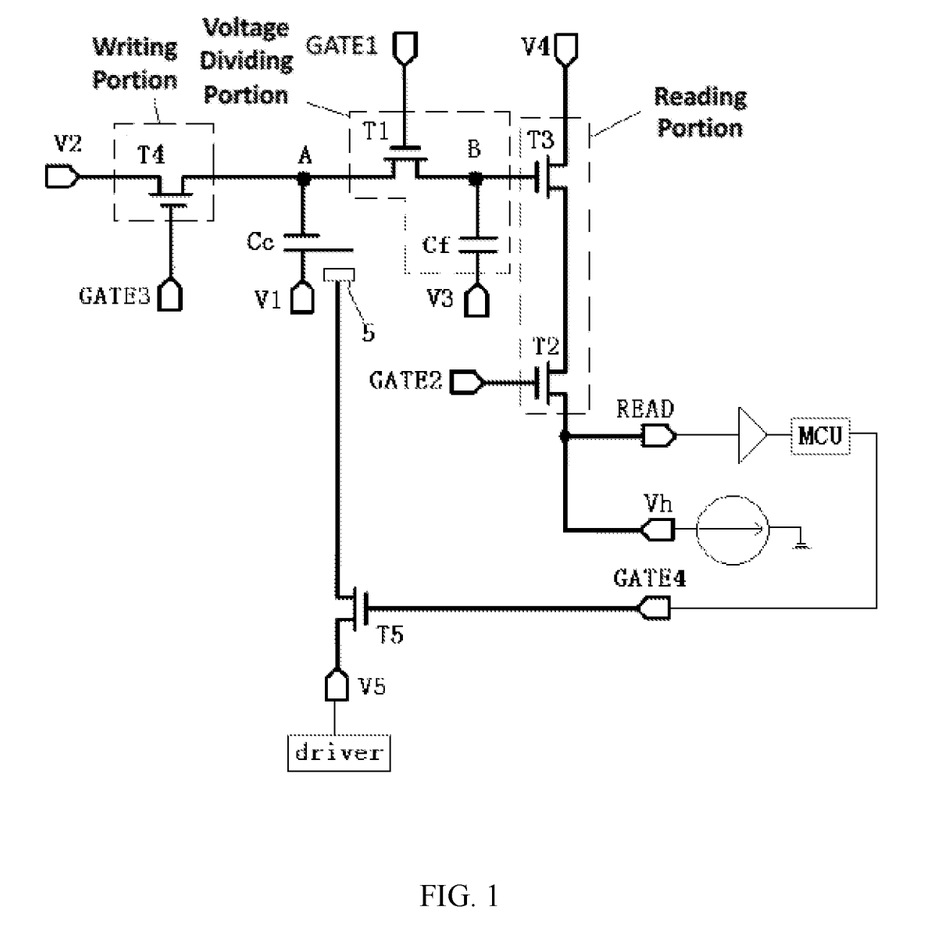
FIG. 1 is a circuit diagram of a microfluidic detection circuit according to some embodiments of the present disclosure.
Figure 2:
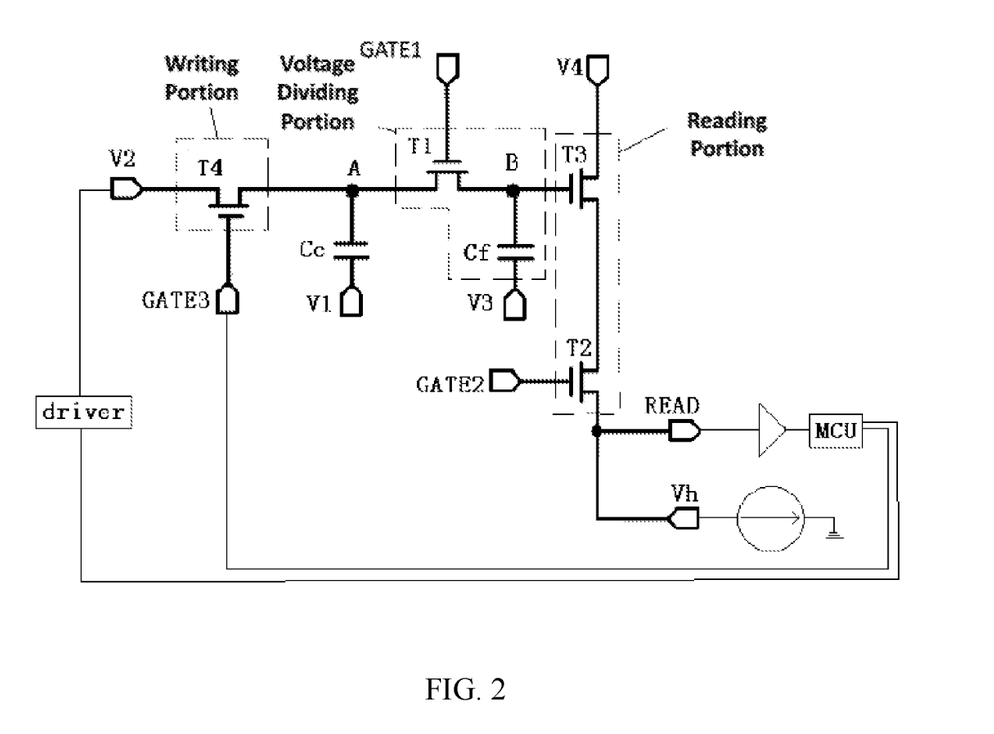
FIG. 2 is a circuit diagram of a microfluidic detection circuit of according to some other embodiments of the present disclosure.

FIG. 1 and FIG. 2 illustrate a microfluidic detection circuit according to some embodiments of the disclosure. As shown in the figures, the microfluidic detection circuit comprises a detection capacitor Cc, a writing sub-circuit, a voltage dividing sub-circuit, and a reading sub-circuit.

A first terminal of the detection capacitor Cc is electrically connected or coupled to a first voltage terminal V1. The writing sub-circuit (as indicated by the box with dotted lines in FIG. 1 and FIG. 2) is electrically connected to a second voltage terminal V2 and to a second terminal of the detection capacitor Cc. The writing sub-circuit is configured to write signals from the second voltage terminal V2 into a second terminal of the detection capacitor Cc (i.e. a node A in the circuit diagram shown in FIG. 1 and FIG. 2).

The voltage dividing sub-circuit (as also indicated by the box with dotted lines in FIG. 1 and FIG. 2) is electrically connected to the second terminal of the detection capacitor Cc (i.e. the node A), and the voltage dividing sub-circuit is configured to divide a voltage at the second terminal of the detection capacitor Cc.

The reading sub-circuit (as also indicated by the box with dotted lines in FIG. 1 and FIG. 2) is electrically connected to the voltage dividing sub-circuit, and is configured to read an electric signal at the second terminal of the detection capacitor Cc after the voltage thereat is divided by the voltage dividing sub-circuit. Herein, the electric signal represents a capacitance value of the detection capacitor Cc.

Herein, when a microfluidic droplet enters into the detection capacitor Cc, the microfluidic droplet can influence the capacitance value of the detection capacitor Cc. As such, in the presence or absence of the microfluidic droplet within the detection capacitor Cc of the microfluidic detection circuit, the dielectric constants between the first terminal and the second terminal of the detection capacitor Cc that correspond respectively to the above two different situations (the presence vs the absence of the microfluidic droplet) is different, which in turn can cause a difference in capacitance values of the detection capacitor Cc.

In addition, the first terminal of the detection capacitor Cc is electrically connected to the first voltage terminal V1 that can provide a preset voltage. Because the second terminal of the detection capacitor Cc (i.e. the node A) is electrically connected to the voltage dividing sub-circuit, thus after the voltage is divided by the voltage dividing sub-circuit, the second terminal of the detection capacitor Cc can obtain a preset electric signal (e.g. voltage), and the electric signal correlates to the aforementioned capacitance value.

As a result, if the aforementioned electric signal can be outputted (for example, outputted to a processor or a processing unit MCU) through the reading sub-circuit, the electric signal can be analyzed to thereby determine the aforementioned capacitance value, which can then be utilized to determine whether there is a droplet at the position corresponding to the microfluidic detection circuit and what size the droplet is. The droplet detection can therefore be realized by means of the microfluidic detection circuit.

Herein, because the function of the voltage dividing sub-circuit is to divide the voltage at the second terminal of the detection capacitor Cc, therefore an electric signal after the voltage division (which can be, for example, the voltage at a second terminal of a voltage dividing capacitor Cf in the voltage dividing sub-circuit illustrated in FIG. 1 and FIG. 2) is equivalent to the electric signal (e.g. voltage) at the detection capacitor Cc. Therefore, as long as the reading sub-circuit is electrically connected to the voltage dividing sub-circuit, the electric signal in the voltage dividing sub-circuit can be read by the reading sub-circuit, to thereby determine the electric signal at the second terminal of the detection capacitor Cc.

For a single microfluidic detection circuit, whether there is droplet at a location of the microfluidic detection circuit can be determined through determining whether the capacitance value changes compared with the case when there is no droplet. As such, through the specific changes of the capacitance values (which can for example be corresponding voltage values), the changes of dielectric constant of the detection capacitor Cc can be estimated, and the amount of the droplet entering into it can be calculated, and ultimately, the size of the droplet at the location can thereby be determined.

If a plurality of microfluidic detection circuits are configured in a microfluidic detection device, through determining which particular microfluidic detection circuit detects the presence of the droplet, the locations (and/or the distributions as well) of the droplet can be determined. The area occupied by the droplet can thereby be determined.

In the microfluidic detection circuit described above, the electric signals to be detected are generated through the voltage division of the detection capacitor Cc by the voltage dividing sub-circuit. Because the electric signals are configured to be stable signals formed after the voltage division, the electric signals are relatively stable and the noise is relatively low, therefore the signal-noise ratio of the detection is relatively low and the accuracy of the detection is relatively high.

According to some embodiments of the microfluidic detection circuit, the voltage dividing sub-circuit comprises a first transistor T1 and a voltage dividing capacitor Cf.

A gate electrode of the first transistor T1 is electrically connected to a first control terminal GATE1. A first electrode of the first transistor T1 is electrically connected to the second terminal of the detection capacitor Cc (i.e. the node A shown in FIG. 1 and FIG. 2). A second electrode of the first transistor T1 is electrically connected to the reading sub-circuit (e.g. to a gate electrode of a third transistor T3 of the reading sub-circuit) via a node B shown in FIG. 1 and FIG. 2.

A first terminal of the voltage dividing capacitor Cf is electrically connected to a third voltage terminal V3. A second terminal of the voltage dividing capacitor Cf is electrically connected to the reading sub-circuit (e.g. to the gate electrode of a third transistor T3 of the reading sub-circuit) and the second electrode of the first transistor T1, via the node B shown in FIG. 1 and FIG. 2.

It should be noted that each transistor has a control electrode (e.g. a gate electrode) and two other electrodes (i.e.

a source electrode and a drain electrode), the ON or OFF state of the other two electrodes are controlled by the gate electrode. In the present disclosure, the first electrode and the second electrode of a transistor (e.g. the first transistor T1, or any other transistor in the disclosure) are respectively the aforementioned other two electrodes, and among these two electrodes, which one is the source electrode and which one is the drain electrode can be determined by a direction of a current in the transistor.

As shown in FIG. 1 and FIG. 2, the voltage dividing sub-circuit may comprise the voltage dividing capacitor Cf which is connected to the detection capacitor Cc in series, therefore the voltage dividing capacitor Cf can divide the voltage of the second terminal of the detection capacitor Cc, that is, the charges over the second terminal of the detection capacitor Cc can be redistributed and the voltage of corresponding locations can be changed. Meanwhile, the voltage dividing sub-circuit further comprises the first transistor T1, it is configured between the detection capacitor Cc and the voltage dividing capacitor Cf, it is configured to control whether the detection capacitor Cc and the voltage dividing capacitor Cf are connected, that is, to control whether to conduct voltage division.

According to some embodiments of the microfluidic detection circuit, the reading sub-circuit comprises a second transistor T2. A gate electrode of the second transistor T2 is electrically connected to a second control terminal GATE2. A first electrode of the second transistor T2 is electrically coupled to the voltage dividing sub-circuit. A second electrode of the second transistor T2 is electrically connected to a reading terminal READ.

Herein, by means of the second transistor T2, which is controlled by the second control terminal GATE2, whether the reading terminal READ can be electrically connected to the voltage dividing sub-circuit (e.g. the second terminal of the voltage dividing capacitor Cf in the voltage dividing sub-circuit) can be controlled. In other words, the second transistor T2 can determine whether the electric signal of the second terminal of the detection capacitor Cc after voltage division by the voltage dividing sub-circuit can be read.

Optionally, the reading sub-circuit further comprises a third transistor T3, as further shown in FIG. 1 and FIG. 2. A gate electrode of the third transistor T3 is electrically connected to the voltage dividing sub-circuit (more specifically, the second electrode of the voltage dividing capacitor Cf of the voltage dividing sub-circuit). A first electrode of the third transistor T3 is electrically connected to a fourth voltage terminal V4. A second electrode of the third transistor T3 is electrically connected to the first electrode of the above second transistor T2, and the second electrode of the second transistor T2 is further electrically connected to a constant current source terminal Vh. The constant current source terminal Vh is electrically connected to a constant current source.

As such, the first electrode of the second transistor T2 is indirectly electrically connected to the voltage dividing sub-circuit through the third transistor T3. It can be seen that the aforementioned third transistor T3 is indeed arranged between the fourth voltage terminal V4 and the constant current source terminal Vh (electrically connecting the constant current source).

As a result, when the second transistor T2 is on, the electric current flowing through the third transistor T3 is constant, therefore, the voltage-drop of the third transistor T3 (i.e. the difference between the voltage of the first electrode and the second electrode) is related to the voltage at its gate electrode, which is related to the electric signal (e.g. voltage) of the second terminal of the detection capacitor Cc. Therefore, the voltage at the reading terminal READ is related to the voltage of the second terminal of the detection capacitor Cc. As such, through reading the voltage at the reading terminal READ, the electric signal (in this case the electric signal is voltage) of the second terminal of the detection capacitor Cc can be analyzed.

It can be seen that the electric signal of the second terminal of the detection capacitor Cc that is read by the reading sub-circuit can indeed be the voltage of this point, and the electric signal can thus be read through loading the voltage onto the gate electrode of the third transistor T3. This above method of reading is beneficial for reducing noise signal, improving the signal-noise ratio, which in turn can improve the detection accuracy.

According to some embodiments of the microfluidic detection circuit, the writing sub-circuit comprises a fourth transistor T4. A gate electrode of the fourth transistor T4 is electrically connected to a third control terminal GATE3. A first electrode of the fourth transistor T4 is electrically connected to the second voltage terminal V2. A second electrode of the fourth transistor T4 is electrically connected to the second terminal of the detection capacitor Cc (i.e. the node A shown in FIG. 1 and FIG. 2).

As such, whether the signal from the second voltage terminal V2 can be written into the second terminal of the detection capacitor Cc (i.e. the node A shown in FIG. 1 and FIG. 2) can be determined through the fourth transistor T4 of the writing sub-circuit. Furthermore, in combination of controlling the on-state or the off-state the aforementioned first transistor T1 of the voltage dividing sub-circuit, the writing sub-circuit can further write the voltage into the second terminal of voltage dividing capacitor Cf (i.e. the node B shown in FIG. 1 and FIG. 2).

According to some embodiments of the microfluidic detection circuit as illustrated in FIG. 1, the microfluidic detection circuit further comprises a driving electrode 5, configured to load a signal from a fifth voltage terminal V5 to thereby form an electric field between the driving electrode 5 and the detection capacitor Cc, such that the droplet can be driven to move.

As further shown in FIG. 1, the microfluidic detection circuit can optionally further comprise a fifth transistor T5. A gate electrode of the fifth transistor T5 is electrically connected to a fourth control terminal GATE4. A first electrode of the fifth transistor T5 is electrically connected to the driving electrode 5. A second electrode of the fifth transistor T5 is electrically connected to the aforementioned fifth voltage terminal V5. With reference to FIG. 1, when the processing unit MCU determines that there is a need to drive the droplet, it may control the fifth transistor T5 to be on, therefore the driving voltage of a driving unit (shown as "driver" in FIG. 1) can be guided to the driving electrode 5.

It is noted that the aforementioned droplet driving control can also be realized through other methods.

In one example, in some embodiments of the microfluidic detection circuit as shown in FIG. 2, the aforementioned third control terminal GATE3 is electrically connected to the processing unit MCU, the second voltage terminal V2 is electrically connected to the driving unit (shown as "driver" in FIG. 2). As such, the processing unit MCU may control the driving voltage to enter the second terminal of the detection capacitor Cc. In other words, the second terminal of the detection capacitor Cc may also be configured as the driving electrode in these embodiments as illustrated in FIG. 2.

In another example, in some other embodiments of the microfluidic detection circuit (not shown in the drawings), there may be no driving unit and its corresponding transistor(s) (i.e. the fifth transistor T5 in FIG. 1 or the fourth transistor T4 in FIG. 2). Instead, the driving electrode 5 or the second terminal of the detection capacitor Cc is directly electrically connected to the processing unit MCU, which thereby directly provides the driving voltage.

In certain embodiments, the voltage dividing sub-circuit comprises a first transistor T1 and a voltage dividing capacitor Cf. For the first transistor T1, its gate electrode is electrically connected to the first control terminal GATE1, and its first electrode is electrically connected to the second terminal of the detection capacitor Cc. For the voltage dividing capacitor Cf, its first terminal is electrically connected to the third voltage terminal V3, and its second terminal is electrically connected to the second electrode of the first transistor T1.

The reading sub-circuit comprises a third transistor T3 and a second transistor T2. For the third transistor T3, its gate electrode is electrically connected to the second terminal of the voltage dividing capacitor Cf, and its first electrode is connected to the fourth voltage terminal V4. For the second transistor T2, its gate electrode is connected to the second control terminal GATE2, its first electrode is connected to the second electrode of the third transistor T3, and its second electrode is connected to the reading terminal READ and the constant current source terminal Vh.

The writing sub-circuit comprises a fourth transistor T4. For the fourth transistor T4, its gate electrode is electrically connected to the third control terminal GATE3, its first electrode is electrically connected to the second voltage terminal V2, and its second electrode is electrically connected to the second terminal of the detection capacitor Cc.

It should be noted that each of the above mentioned terminals of the microfluidic detection circuit described above is electrically connected to a corresponding signal source. For example, each of the control terminals (i.e. the first control terminal GATE 1, the second control terminal GATE2, the third control terminal GATE3, the fourth control terminal GATE4) can be electrically connected to a corresponding control line or the processing unit MCU.

Each of the voltage terminals (i.e. first voltage terminal V1, the second voltage terminal V2, the third voltage terminal V3, the fourth voltage terminal V4, and the fifth voltage terminal V5) is electrically connected to a corresponding voltage source. Herein, the fifth voltage terminal V5 can be electrically connected to the driving unit ("driver" shown in FIG. 1 and FIG. 2) which provides a driving voltage thereto.

In addition, the constant current source terminal Vh is electrically connected to a constant current source, and then connected to the ground. The reading terminal READ can be electrically connected to the processing unit MCU through an amplifier (as shown by the right-pointing triangle in FIG. 1 and FIG. 2). The processing unit MCU can be a microcontroller unit, which can be in the form of a microcontroller Unit or a host computer, etc.

It should be noted that when there is a plurality of microfluidic detection circuits, some, or all of, the aforementioned signal sources can be shared. For example, the corresponding control terminals of the plurality of microfluidic detection circuits at a same line may be electrically connected to a same control line (which can be similar to a gate line). The reading terminals READ of the microfluidic detection circuits of a same column may be electrically connected to a same terminal of the processing unit MCU. Each voltage terminal that provides a constant voltage may be connected to a same constant voltage power supply, and so on.

In summary, by detecting and analyzing the change of capacitance value of the detection capacitor included therein, the microfluidic detection circuit disclosed herein can, if applied in a microfluidic apparatus, be used to detect whether there is a droplet at the position corresponding to the microfluidic detection circuit and what size the droplet is. Then based on the position and size of the droplet, the microfluidic apparatus can further control the moving track of the droplet within the microfluidic apparatus. This can be realized by sending a control signal to a driving TFT thereby apply a driving voltage through the driving TFT, and form potential difference between the lower electrode and the upper common electrode, thus affecting the droplet shrinkage angle and changing the surface tension of the droplet, so as to realize the droplet movement.

In a second aspect, the present disclosure provides a microfluidic detection method, which can be utilized in the microfluidic detection circuit as described above and illustrated in FIG. 1 and FIG. 2.

Figure 3:
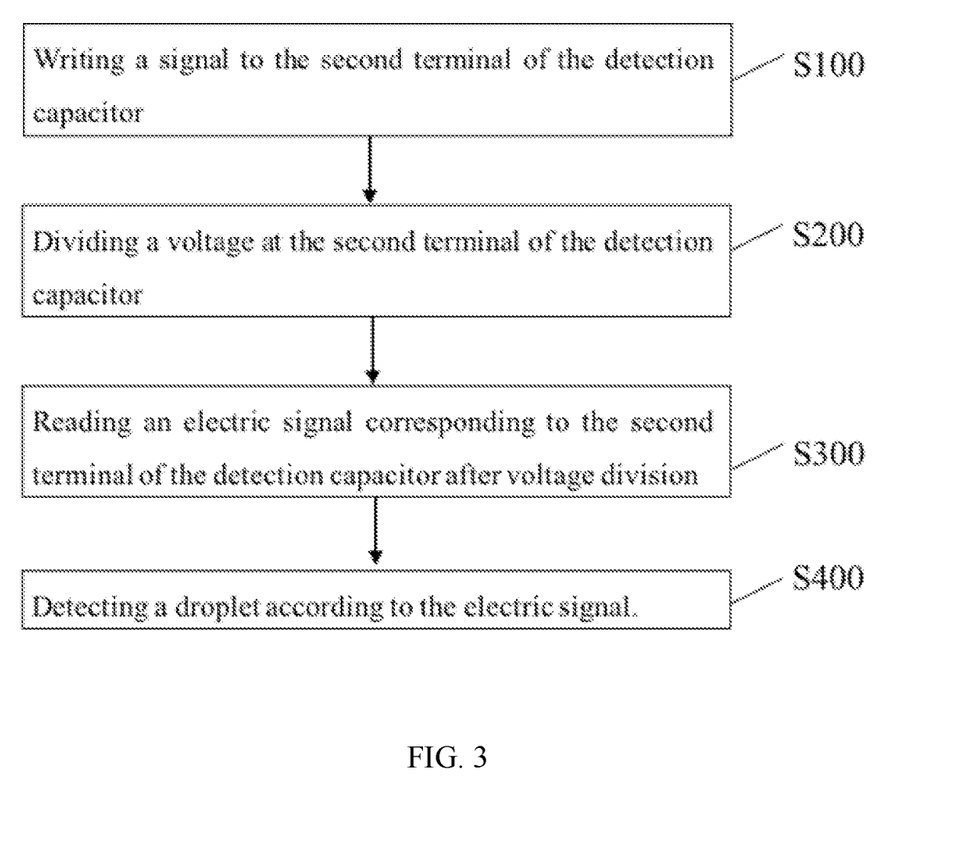
FIG. 3 is a flow chart of a method for driving a microfluidic detection circuit according to some embodiments of the disclosure.

According to some embodiments of the disclosure illustrated in FIG. 3, the microfluidic detection method comprises the following steps:

S100: writing a signal to the second terminal of the detection capacitor Cc;

S200: dividing a voltage at the second terminal of the detection capacitor Cc;

S300: reading an electric signal corresponding to the second terminal of the detection capacitor Cc after voltage division; and S400: detecting a droplet according to the electric signal.

In the microfluidic detection method described above, a preset signal can be first written to the second terminal of the detection capacitor Cc, next the voltage at the second terminal of the detection capacitor Cc can be divided, and then the electric signal corresponding to the second terminal of the detection capacitor Cc after voltage division can be obtained.

Herein, the electric signal reflects a capacitance value of the detection capacitor Cc. Thus by analyzing the electric signal, the parameters of the droplet, such as whether or not there is a droplet at a position corresponding to the microfluidic detection circuit, and the size of the droplet, etc., can thereby be determined. As such, the detection of the droplet can be achieved.

Figure 4:
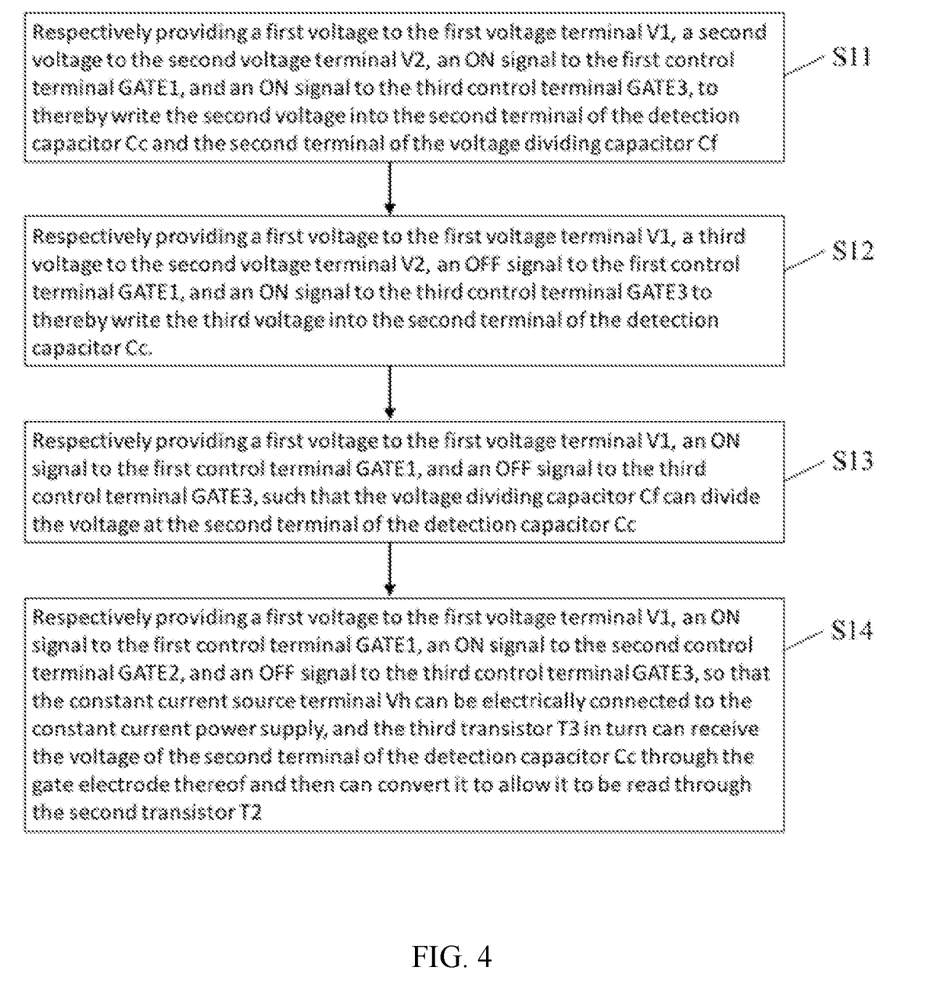
FIG. 4 is a flow chart of a method for driving a microfluidic detection circuit according to one specific embodiment of the disclosure.

In the following, with reference to the microfluidic detection circuit as shown in FIG. 1 and FIG. 2, one specific embodiment of the microfluidic detection method is provided. As illustrated in FIG. 4, the method specifically comprises:

S11: a first writing stage;

This stage specifically includes: respectively providing a first voltage to the first voltage terminal V1, providing a second voltage to the second voltage terminal V2, providing an ON signal (i.e. a signal that can enable the corresponding transistor to be on) to the first control terminal GATE1, and providing an ON signal to the third control terminal GATE3 to thereby write the second voltage into the second terminal of the detection capacitor Cc and the second terminal of the voltage dividing capacitor Cf.

During this stage, the fourth transistor T4 and the first transistor T1 are both on, therefore the signal of the second voltage terminal V2 (i.e. the second voltage) can be written into the node A and the node B.

S12: a second writing stage:

This stage specifically includes: respectively providing a first voltage to the first voltage terminal V1, providing a third voltage to the second voltage terminal V2, providing an OFF signal (i.e. a signal that does not turn on the corresponding transistor) to the first control terminal GATE1, providing an ON signal to the third control terminal GATE3 to thereby write the third voltage into the second terminal of the detection capacitor Cc.

During this stage, the first transistor T1 is off, the fourth transistor T4 is on, and the second voltage terminal V2 provides the third voltage (which is different from the second voltage in S11), therefore the voltage at the node A is changed to the third voltage, whereas the voltage at the node B remains the second voltage.

S13: a voltage dividing stage:

This stage specifically includes: respectively providing a first voltage to the first voltage terminal V1, providing an ON signal to the first control terminal GATE1, providing an OFF signal to the third control terminal GATE3, such that the voltage dividing capacitor Cf can divide the voltage at the second terminal of the detection capacitor Cc.

During this stage, the fourth transistor T3 is off and the first transistor T1 is on, therefore, the node A and the node B originally having different voltages can be electrically connected, and the charges are thus redistributed between the second terminal of the detection capacitor Cc and the voltage dividing capacitor Cf, realizing a voltage division as a consequence. Ultimately, the node A and the node B can reach new stable voltage, and the value of this voltage is related to the capacitance values of these two capacitors (i.e. the detection capacitor Cc and the voltage dividing capacitor C0.

S14: a reading stage:

This stage specifically includes: respectively providing a first voltage to the first voltage terminal V1, providing an ON signal to the first control terminal GATE1, providing an ON signal to the second control terminal GATE2, providing an OFF signal to the third control terminal GATE3, so that the constant current source terminal Vh can be electrically connected to the constant current power supply, and the third transistor T3 in turn can receive the voltage of the second terminal of the detection capacitor Cc through the gate electrode thereof and then can convert it to allow it to be read through the second transistor T2.

During this stage, the second transistor T2 is on, the constant current source terminal Vh is electrically connected to the constant current power supply. Therefore, the electric current flowing through the third transistor T3 is stable, therefore the voltage-drop of the third transistor T3 can be determined by the voltage of its gate electrode. As such, the voltage of the reading terminal READ can be determined by the voltage of the gate electrode of the third transistor T3.

Meanwhile, because the gate electrode of the third transistor T3 is electrically connected to the second terminal of the detection capacitor Cc through the first transistor T1, the voltage at the gate electrode of the third transistor T3 is equal to the voltage at the second terminal of the detection capacitor Cc. As such, the third transistor T3 can convert the voltage at the second terminal of the detection capacitor Cc and then allow it to be read through the second transistor T2.

Through analyzing the voltage obtained thereby, the aforementioned first voltage, the second voltage, the third voltage and the capacitance value (which is known) of the voltage dividing capacitor, the capacitance value of the detection capacitor Cc can thereby be determined, and in turn the droplet detection can thereby be realized.

In the aforementioned method, the voltage of each electrode of the detection capacitor Cc and the voltage dividing capacitor Cf is definite. Obviously, in the case where the voltage of each electrode of each of the two above capacitors is definite, the voltage obtained after the voltage division and the capacitance values of the two capacitors have a definite and known relationship. Furthermore, because the capacitance value of the voltage dividing capacitor Cf is also known, therefore, through the voltage obtained after the voltage division, the capacitance value of the detection capacitor Cc can thereby be determined, and the droplet detection can thus be realized.

It should be further noted that during the aforementioned process, a stable voltage is usually provided to the third voltage terminal V3 and the fourth voltage terminal V4.

Figure 5:
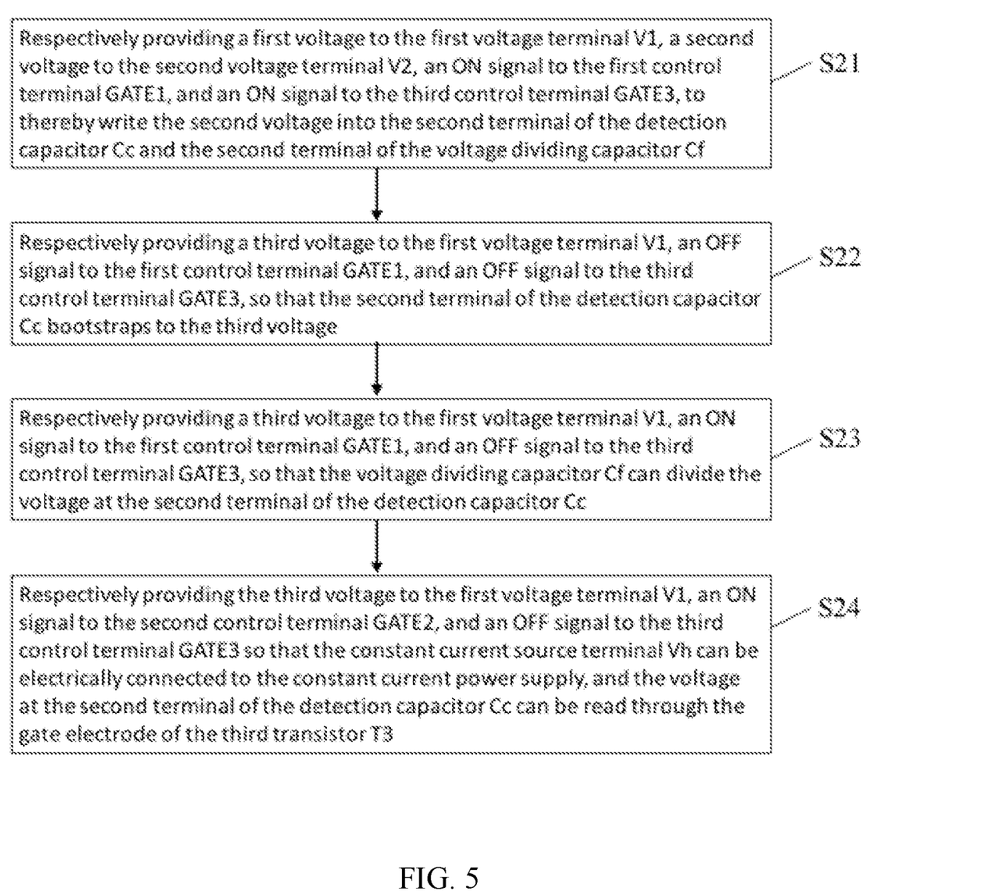
FIG. 5 is a flow chart of a method for driving a microfluidic detection circuit according to another specific embodiment of the disclosure.

In the following, with also reference to the microfluidic detection circuit as shown in FIG. 1 and FIG. 2, another specific embodiment of the microfluidic detection method is provided. As illustrated in FIG. 5, the method specifically comprises:

S21: a first writing stage;

This stage specifically includes: respectively providing a first voltage to the first voltage terminal V1, providing a second voltage to the second voltage terminal V2, providing an ON signal to the first control terminal GATE1, providing an ON signal to the third control terminal GATE3, to thereby write the second voltage into the second terminal of the detection capacitor Cc and the second terminal of the voltage dividing capacitor Cf.

During the stage herein, the fourth transistor T4 and the first transistor T1 are both on, therefore the signal of the second voltage terminal V2 (i.e. the second voltage) is written into the node A and the node B.

S22: a second writing stage;

This stage specifically includes: respectively providing a third voltage to the first voltage terminal V1, providing an OFF signal to the first control terminal GATE1, providing an OFF signal to the third control terminal GATE3, so that the second terminal of the detection capacitor Cc bootstraps to the third voltage.

Differing from the above mentioned stage S12, during this stage S22 herein, the fourth transistor T4 is off, and the third voltage terminal provides a third voltage that is different from the first voltage. At this time, the voltage at the node A is changed to the third voltage because of the bootstrap effect, and the node B remains at the original second voltage.

S23: a voltage division stage;

This stage specifically includes: respectively providing a third voltage to the first voltage terminal V1, providing an ON signal to the first control terminal GATE1, providing an OFF signal to the third control terminal GATE3, so that the voltage dividing capacitor Cf can divide the voltage at the second terminal of the detection capacitor Cc.

During this stage, the first transistor T2 is on, thus electrically connecting the node A and the node B which originally have different voltage values. Thereby, the charges between the second terminal of the detection capacitor Cc and the second terminal of the voltage dividing capacitor Cf can be redistributed, and the voltage division can be therefore realized. Ultimately, the node A and the node B can reach new stable voltage, and the value of this voltage is related to the capacitance values of these two capacitors (i.e. the detection capacitor Cc and the voltage dividing capacitor Cf).

S24: a reading stage;

This stage specifically includes: respectively providing the third voltage to the first voltage terminal V1, providing an ON signal to the second control terminal GATE2, providing an OFF signal to the third control terminal GATE3 so that the constant current source terminal Vh can be electrically connected to the constant current power supply, and the voltage at the second terminal of the detection capacitor Cc can be read through the gate electrode of the third transistor T3.

During this stage, the second transistor T2 is on, the constant current source terminal Vh is electrically connected to the constant current power supply, therefore the electric current flowing through the third transistor T3 is constant. As a result, the voltage-drop of the third transistor T3 is determined by the voltage of its gate electrode. As such, the voltage of the reading terminal READ can be determined by the gate electrode voltage of the third transistor T3.

Meanwhile, because the gate electrode of the third transistor T3 is electrically connected to the second terminal of the detection capacitor Cc through the first transistor T1, its gate electrode voltage is equal to the voltage of the second terminal of the detection capacitor Cc, therefore the third transistor T3 can indeed convert the voltage of the second terminal of the detection capacitor Cc, and the converted voltage can be read through the second transistor T2.

It should be noted that during the aforementioned process, a stable voltage should be usually provided to the third voltage terminal T3 and the fourth voltage terminal T4.

It can be seen that compared with the aforementioned embodiment of the method, the difference of this embodiment of the method described herein is as follows: the charge redistribution is realized through a change in voltage of the first voltage terminal V1, instead of through a change in voltage of the second voltage terminal V2.

As noted above, some embodiments of the microfluidic detection circuit comprise a driving electrode 5. As such, according to some embodiments of the microfluidic detection method, after the detection of the droplet according to the electric signal in step S400, the method further comprises:

S500: determining whether to drive the droplet based on the detection result, and respectively providing an ON signal to the fourth control terminal GATE4 and providing a driving voltage to the fifth voltage terminal V5 if so.

That is, when the location at a particular moment, and/or a size, of the droplet is determined, the processing unit MCU can determine whether it is needed to drive the droplet based on this detection result. If so (i.e. needed to drive), the processing unit MCU can set a motion track of the droplet, and then drives the droplet to move along the motion track to thereby realize a full microfluidic control process.

Specifically, when the microfluidic detection circuit equipped with the driving electrode 5 drives the droplet, the processing unit MCU can control the fifth transistor T5 to be on, therefore the driving voltage can be guided to the driving electrode 5. As a result, an electric field can be formed between the driving electrode 5 and a common electrode 1, thus the contraction angle of the droplet can be influenced, and the surface tension of the droplet is thereby changed, and consequently, the droplet will be driven to move along the motion track that has been preset.

It is noted that because the driving electrode 5 is relatively independent from other structures or components of the microfluidic detection circuit, the droplet driving and droplet detection are not necessarily sequential, and they can be conducted simultaneously or alternatively can be sequential.

As noted above, some embodiments of the microfluidic detection circuit are not equipped with a driving electrode 5. According to some other embodiments of the microfluidic detection method, after the detection of the droplet according to the electric signal in step S400, the method further comprises:

S500': determining whether to drive the droplet based on the detection result, and providing a driving voltage to the second terminal of the detection capacitor Cc to drive the droplet to move if so.

That is, for the microfluidic detection circuit without a driving electrode 5 as shown in FIG. 2, when there is a need to drive the droplet, the driving voltage can be provided to the second terminal of the detection capacitor Cc (e.g. provided through the second voltage terminal V2 and the fourth transistor T4, as shown in FIG. 2), therefore the second terminal of the detection capacitor Cc is configured as the driving electrode.

In the aforementioned method, there are no separate driving electrode and corresponding transistor(s) (such as the fifth transistor T5) in the microfluidic detection circuit. In other words, the second terminal of the detection capacitor Cc is configured as the driving electrode in a time-sharing manner, and the transistor of the writing sub-circuit (i.e. the fourth transistor T4) is configured as the transistor to control the driving electrode at this time. As such, the number of components is reduced, and the structure of the product is relatively simpler and the cost is relatively lower.

Because the driving electrode and the second terminal of the detection capacitor Cc are configured at different time for different functions, the detection phase and driving phase have to be done alternately. That is, the detection is first conducted to obtain the location of the droplet, and the droplet is then driven to move, and the repeated cycle of the detection phase and the driving phase can continue.

Because the signal of the driving electrode and the second terminal of the detection capacitor Cc are written through the first voltage terminal V1, therefore the structure or component that is electrically connected to the first voltage terminal V1 shall be able to provide different voltages under control of the processing unit MCU. For example, when it is the driving unit (i.e. "driver" in FIG. 1 and FIG. 2), the driving unit can comprise a digital logical circuit.

Depending on the different structures of microfluidic detection circuit, the corresponding microfluidic detection method can also be different, and a method can be adopted as long as the droplet can be detected though the electric signal of the second terminal of the detection capacitor Cc.

In a third aspect, the present disclosure further provides a microfluidic apparatus.

The microfluidic apparatus can include at least one circuit, and each of the at least one circuit can be based on the microfluidic detection circuit according to any one of the embodiments described above.

Figure 6:
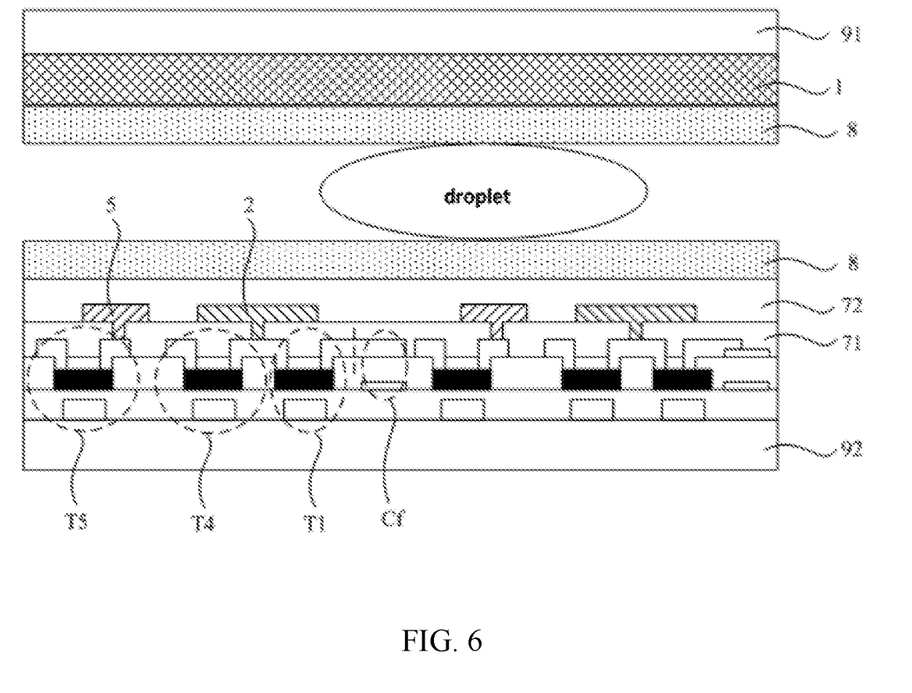
FIG. 6 is a cross-sectional view of a microfluidic apparatus according to some embodiments of the present disclosure.

FIG. 6 illustrates a microfluidic apparatus according to some embodiments of the disclosure. With reference to FIG. 1, FIG. 2 and FIG. 6, the microfluidic apparatus comprises a first substrate 91 and a second substrate 92, which are opposingly arranged against each other. The microfluidic apparatus further comprises at least one microfluidic detection circuit, which is arranged between the first substrate 91 and the second substrate 92. Each of the at least one microfluidic detection circuit can be the microfluidic detection circuit as described above.

For each microfluidic detection circuit, the first terminal of the detection capacitor Cc is a common electrode 1 in the microfluidic apparatus, which is arranged over a side of the first substrate 91 that faces the second substrate 92. The second terminal of the detection capacitor Cc is a detection electrode 2 in the microfluidic apparatus, which is arranged over a side of the second substrate 92 that faces the first substrate 91. The common electrode 1 and the detection electrode 2 in each microfluidic detection circuit are disposed to opposingly face each other, and a space is formed between those two electrodes to thereby accommodate the droplet and allow the droplet to move therein.

As such, the microfluidic apparatus comprises two substrates (i.e. the first substrate 91 and the second substrate 92) that opposingly face each other, and the space between the two substrates is the space to contain droplets. In addition, one or more microfluidic detection circuits are configured in the microfluidic apparatus, with the two terminals of the detection capacitor Cc of each microfluidic detection circuit as the common electrode 1 and the detection electrode 2, respectively. These two electrodes are respectively arranged in the two substrates (i.e. the first substrate 91 and the second substrate 92), therefore the detection capacitor Cc can be formed between the two electrodes. A droplet located between the two substrates is inside the detection capacitor Cc, and can influence the capacitance value of the detection capacitor Cc, to thereby allow the detection of the droplet.

According to some embodiments, the number of the at least one microfluidic detection circuit is more than one, and it is further configured such that the common electrode in each microfluidic detection circuit is arranged at a substantially same layer, and at least some of the common electrodes are integrated with one another.

Figure 7:
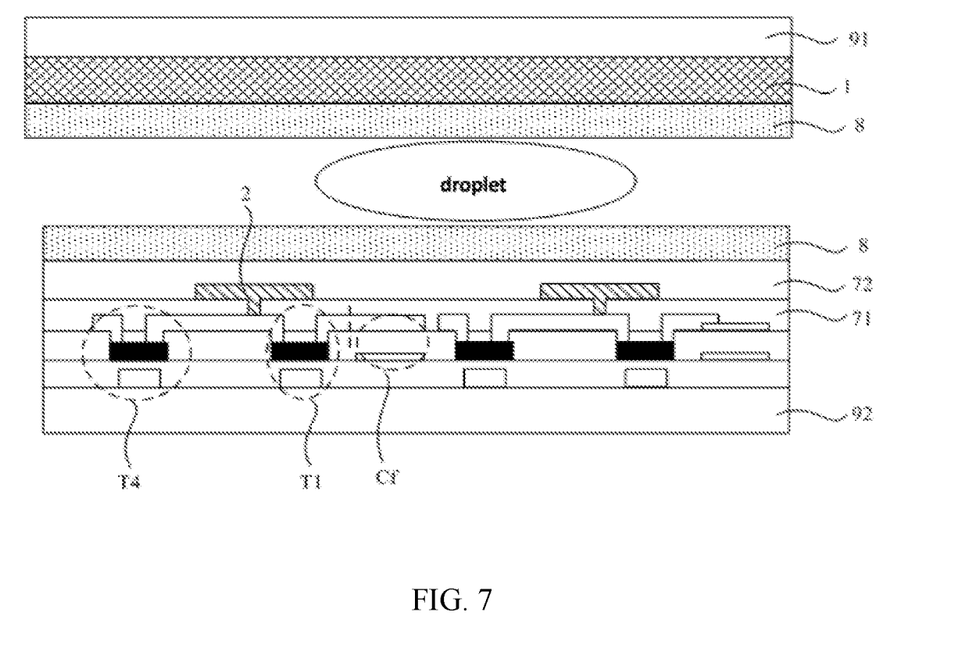
FIG. 7 is a cross-sectional view of a microfluidic apparatus according to some other embodiments of the present disclosure.

That is, a plurality of microfluidic detection circuits can be configured at different locations in the microfluidic apparatus (e.g. arranged in the form of an array), so that droplets at different locations can be detected. As shown in FIG. 6 and FIG. 7, in order to simplify the manufacturing process, the common electrode 1 of each microfluidic detection circuit can be arranged at a same layer. Meanwhile, at least some of the common electrodes 1 are integrated to thereby reduce electrical resistance. It would be better if all common electrodes 1 form a single electrode layer.

In some embodiments of the microfluidic apparatus, each microfluidic detection circuit can have the circuit structure whose diagram is illustrated in FIG. 1 or FIG. 2, and thus can include the first transistor T1, the second transistor T2, the third transistor T3, the fourth transistor T4, and optionally the fifth transistor T5 (i.e. in FIG. 1 only). As such, in order to further simplify the manufacturing process, at least two, and more preferably all, of the above transistors can be configured to be arranged at a substantially same layer.

For example, in the microfluidic apparatus shown in FIG. 5 and FIG. 6, which both have the microfluidic detection circuit as shown in FIG. 1 or FIG. 2, the first transistor T1 and the fourth transistor T4 can be configured over the side of the second substrate 92 that is proximal to the first substrate 91; the first transistor T1 and the fourth transistor T4 are configured at a substantially same layer; at least one insulating layer (e.g. passivation layer 71 shown in FIG. 6 and FIG. 7) is configured over a side of the first transistor T1 and the fourth transistor T4 that is far away from (i.e. distal to) the second substrate 92; the detection electrode 2 is configured over a side of the insulating layer (i.e. the passivation layer 71) that is far away from the second substrate 92. The detection electrode 2 is electrically connected to the first electrode of the first transistor T1 and the second electrode of the fourth transistor T4 through a via in the at least one insulating layer (i.e. the passivation layer 71).

Herein, the function of the insulating layer is to prevent unwanted electrical conduction between each electrode and each transistor, and thus the insulating layer can be a single layer (e.g. the passivation layer 71), but can also comprise a plurality of layers. For example, a planarization layer can be configured over a side of the passivation layer 71 that is far away from the second substrate 92, and the planarization layer can serve to flatten the uneven surface caused by components such as transistors and guide lines so that each electrode can be formed over a flat base.

That is, as shown in FIG. 6 and FIG. 7, the detection electrode 2 can be arranged to be farther away from the substrate 92 than the first transistor T1 and the fourth transistor T4, and the detection electrode 2 is electrically connected to the two transistors through the via in the passivation layer 71, the aforementioned circuit structure may be implemented.

Meanwhile, in order to simplify the manufacturing process, the first transistor T1 and the fourth transistor T4 can be configured at a substantially same layer, that is, corresponding structures (such as active region, gate electrode, gate insulating layer, source-drain electrode) in different transistors can all be configured at a substantially same layer to simplify the manufacturing process.

It should be noted that according to some embodiments of the microfluidic apparatus, other transistors, such as the second transistor T2, the third transistor T3, and/or the fifth transistor T5 as illustrated in FIG. 1 and/or FIG. 2, may also be configured at a substantially same layer with the first transistor T1 and the fourth transistor T4 (i.e. all transistors are arranged at a substantially same layer), to thereby allow the manufacturing process for the microfluidic apparatus to be as simplified as possible.

According to some embodiments, the microfluidic apparatus further comprises two hydrophobic layers 8, which can be arranged respectively over a side of the common electrode 1 that faces the second substrate 92 and over the side of the detection electrode 2 that faces the first substrate 91.

As shown in FIG. 6 and FIG. 7, the uppermost surface of these two substrates (that is, the outer side of each electrode) can all be the hydrophobic layer 8, thus the droplet will not make the surface of the substrate wet, so that it is advantageous for the movement of the droplet. In order to prevent the influence of the hydrophobic layer 8 to the components in the circuit, an insulating structure such as a dielectric layer 72 can be configured between the hydrophobic layer 8 and the electrodes and transistors (that is, each electrode may be configured between the insulating layer and the dielectric layer 72).

In some embodiments, the microfluidic apparatus may further comprise a driving electrode 5, which is configured at a substantially same layer with the detection electrode 2. An electric field can be formed between it and the common electrode 1 to thereby drive the droplet to move. The fifth transistor T5 is configured at a substantially same layer with the first transistor T1 and the fourth transistor T4, and for the fifth transistor T5, its gate electrode is electrically connected to the fourth control terminal GATE 4, its first electrode is electrically connected to the driving electrode 5 through the via in the insulating layer (i.e. the passivation layer 71), and its second electrode is electrically connected to the fifth voltage terminal V5.

Furthermore, the driving electrode 5 can be configured in the microfluidic apparatus, and can be configured to drive the droplet to move according to the detection result. Because an electric field needs to be formed between the driving electrode 5 and the common electrode 1, optionally it can be configured at a substantially same layer with the detection electrode 2. In order to simply the process, the fifth transistor T5 that is configured to control it can also be arranged at a substantially same layer with other transistors.

It is noted that the aforementioned driving electrode 5 can optionally correspond to the microfluidic detection circuit in a one-to-one relationship, or the driving electrode 5 can be configured to correspond to some, but not all, of the microfluidic detection circuits, or the driving electrode 5 can be independently configured outside the microfluidic detection circuit. The actual configuration for the driving electrode 5 can be based on practical needs.

It is noted that in some embodiments of the microfluidic apparatus, there is no driving electrode, and the detection electrode 2 may be configured to drive the droplets according to the aforementioned method.

However, in order to avoid the influence of the electric field of the voltage dividing capacitor Cf to the detection phase, the electrodes at two ends of it can be optionally arranged at a location that is relatively far away from other components such as the detection electrode 2 and the driving electrode 5 from where the droplet is located. For example, in some embodiments shown in FIG. 6 and FIG. 7, the second terminal of the voltage dividing capacitor Cf and the second electrode of the first transistor T1 are configured at a substantially same layer and are integrated, and the first terminal of the voltage dividing capacitor Cf is closer to the second substrate 92 than its second terminal.

In the microfluidic apparatus disclosed herein, driving of droplets to move and detection of the droplets moving in the microfluidic apparatus can take different approaches.

According to some embodiments, each circuit in the microfluidic apparatus has separate electrodes for detecting and for driving droplets (i.e. the detection electrode and the driving electrode are separate and different), such as the embodiment illustrated in FIG. 6, which can exemplarily adopt a diagram structure shown in FIG. 1, as such, for a given droplet, the detection of its position and the driving of its moving can be performed at a same time, but can also be performed in a time-sharing manner.

According to some other embodiments, each circuit in the microfluidic apparatus has a shared electrode for detecting and for driving droplets (i.e. the detection electrode and the driving electrode are integrated into a common electrode), such as the embodiment illustrated in FIG. 7, as such, for a given droplet, the detection of its position and the driving of its moving can only be performed separately in a time-sharing manner.

All references cited in the present disclosure are incorporated by reference in their entirety. Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A circuit, comprising a detection capacitor, wherein:
the detection capacitor comprises a first terminal and a second terminal, spaced apart from one another to thereby form a space therebetween; and
the circuit is configured:
to detect a droplet present in the space by detecting a change of a capacitance value of the detection capacitor caused by a change of a dielectric constant between the first terminal and the second terminal; and
to drive a formation of an electrical field formed using at least one of the first terminal and the second terminal of the detection capacitor to thereby drive the droplet to move in the electrical field;
the circuit further comprising a writing sub-circuit, a voltage dividing sub-circuit, and a reading sub-circuit, wherein:
the first terminal of the detection capacitor is electrically connected to a first voltage terminal;
the writing sub-circuit is electrically connected to a second voltage terminal and to the second terminal of the detection capacitor respectively, and is configured to write a first signal from the second voltage terminal into the second terminal of the detection capacitor;
the voltage dividing sub-circuit is electrically connected to the second terminal of the detection capacitor, and is configured to divide a voltage at the second terminal of the detection capacitor; and
the reading sub-circuit is electrically connected to the voltage dividing sub-circuit, and is configured to read an electric signal at the second terminal of the detection capacitor after the voltage at the second terminal of the detection capacitor is divided by the voltage dividing sub-circuit, wherein the electric signal reflects the capacitance value of the detection capacitor.

2. The circuit of claim 1, wherein the voltage dividing sub-circuit comprises:
a first transistor, wherein:
a gate electrode of the first transistor is electrically connected to a first control terminal;
a first electrode of the first transistor is electrically connected to the second terminal of the detection capacitor; and
a second electrode of the first transistor is electrically connected to the reading sub-circuit;
and
a voltage dividing capacitor, wherein:
a first terminal of the voltage dividing capacitor is electrically connected to a third voltage terminal; and
a second terminal of the voltage dividing capacitor is electrically connected to the reading sub-circuit and the second electrode of the first transistor.

3. The circuit of claim 1, wherein the reading sub-circuit comprises a second transistor, wherein:
a gate electrode of the second transistor is electrically connected to a second control terminal;
a first electrode of the second transistor is electrically coupled to the voltage dividing sub-circuit; and
a second electrode of the second transistor is electrically connected to a reading terminal.

4. The circuit of claim 3, wherein:
the reading sub-circuit further comprises a third transistor, wherein:
a gate electrode of the third transistor is electrically connected to the voltage dividing sub-circuit;
a first electrode of the third transistor is electrically connected to a fourth voltage terminal; and
a second electrode of the third transistor is electrically connected to the first electrode of the second transistor;

and
the second electrode of the second transistor is further electrically connected to a constant current source terminal.

5. The circuit of claim 1, wherein the writing sub-circuit comprises a fourth transistor, wherein:
a gate electrode of the fourth transistor is electrically connected to a third control terminal;
a first electrode of the fourth transistor is electrically connected to the second voltage terminal; and
a second electrode of the fourth transistor is electrically connected to the second terminal of the detection capacitor.

6. The circuit of claim 3, further comprising a processor, electrically coupled to the reading terminal and configured to obtain a voltage outputted from the reading terminal to thereby calculate the electric signal at the second terminal of the detection capacitor.

7. The circuit of claim 6, wherein the processor is further configured to control the circuit to drive the droplet to move in the electrical field.

8. The circuit of claim 7, wherein the processor is configured to control the circuit to drive the droplet to move in the electrical field in a time-sharing manner with controlling the circuit to detect the droplet.

9. The circuit of claim 7, further comprising a driving electrode, arranged over one of the first terminal and the second terminal of the detection capacitor, wherein:
the driving electrode is electrically coupled to the processor and is configured, under control of the processor, to form the electric field between the driving electrode and the one of the first terminal and the second terminal of the detection capacitor to thereby drive the droplet to move in the electric field.

10. The circuit of claim 9, further comprising a fifth transistor, wherein:
a first electrode of the fifth transistor is electrically connected to the driving electrode;
a gate electrode of the fifth transistor is electrically connected to a fourth control terminal; and
a second electrode of the fifth transistor is electrically connected to a fifth voltage terminal;
wherein:
the processor is electrically coupled with the fourth control terminal and is configured to control whether to turn on the fifth transistor to allow a signal from the fifth voltage terminal to load to the driving electrode to thereby form the electric field between the driving electrode and the one of the first terminal and the second terminal of the detection capacitor.

11. The circuit of claim 7, wherein the detection capacitor is electrically coupled to the processor, and is configured, under control of the processor, to form the electrical field between the first terminal and the second terminal thereof to thereby drive the droplet to move in the electrical field.

12. A microfluidic apparatus, comprising at least one circuit, wherein each of the at least one circuit is the circuit according to claim 1.

13. The microfluidic apparatus of claim 12, further comprising a first substrate and a second substrate, opposing to each other, wherein:
the each of the at least one circuit is between the first substrate and the second substrate, wherein:
the first terminal of the detection capacitor is a common electrode, arranged over a side of the first substrate proximal to the second substrate;
the second terminal of the detection capacitor is a detection electrode, arranged over a side of the second substrate proximal to the first substrate; and
the common electrode and the detection electrode are opposing to each other to thereby form the space accommodating the droplet.

14. The microfluidic apparatus of claim 13, further comprising a driving electrode, opposing to the common electrode, wherein the driving electrode is configured to form the electric field with the common electrode to thereby drive the droplet to move therein.

15. The microfluidic apparatus of claim 13, wherein the detection electrode is further configured as a driving electrode for driving the droplet to move in a time sharing manner with serving as the detection electrode for detecting the droplet in the space.

16. A method for driving the circuit according to claim 1, comprising a detecting phase, the detecting phase comprising:
writing a signal to the second terminal of the detection capacitor;
dividing a voltage at the second terminal of the detection capacitor;
reading an electric signal corresponding to the second terminal of the detection capacitor after voltage division; and
detecting a droplet according to the electric signal.

17. The method according to claim 16, further comprising a driving phase, the driving phase comprising:
providing a driving signal to the at least one of the first terminal and the second terminal of the detection capacitor to thereby drive the droplet to move in the electrical field.

18. The method according to claim 17, wherein the circuit further comprises a driving electrode, configured to be able to form the electrical field with one of the first terminal and the second terminal of the detection capacitor, wherein the method further comprises, between the detecting phase and the driving phase:
determining whether to perform the driving phase based on a result of detection of the droplet.

19. The method according to claim 17, wherein in the circuit, the first terminal and the second terminal of the detection capacitor are further configured to be able to form the electrical field, wherein the detection phase and the driving phase are in a time-sharing manner.

* * * * *